(12) United States Patent
Schanz et al.

(10) Patent No.: US 6,765,960 B1
(45) Date of Patent: Jul. 20, 2004

(54) METHOD AND DEVICE FOR DETECTING A CHANGE BETWEEN PIXEL SIGNALS WHICH CHRONOLOGICALLY FOLLOW ONE ANOTHER

(75) Inventors: Michael Schanz, Oberhausen (DE); Su-Birm Park, Bochum (DE); Andreas Teuner, Essen (DE); Markus Schwarz, Duisburg (DE); Bedrich Hosticka, Duisburg (DE)

(73) Assignee: Fraunhofer-Gesellschaft Zur Foerderung der Angewandten Forschung e. V., Munich (DE)

( * ) Notice: Subject to any disclaimer, the term of this patent is extended or adjusted under 35 U.S.C. 154(b) by 0 days.

(21) Appl. No.: 09/485,420

(22) PCT Filed: Aug. 14, 1997

(86) PCT No.: PCT/EP97/04452

§ 371 (c)(1),
(2), (4) Date: May 9, 2000

(87) PCT Pub. No.: WO99/09736

PCT Pub. Date: Feb. 25, 1999

(51) Int. Cl.$^7$ ................................................ H04N 7/12
(52) U.S. Cl. ................................................. 375/240.01
(58) Field of Search ........................ 348/699, 700, 348/607, 619, 620, 625, 628; 375/240.01, 240.12; 382/284, 232, 238; 708/203; H04N 7/12

(56) References Cited

U.S. PATENT DOCUMENTS

| 5,579,444 A | * 11/1996 | Dalziel et al. ................ 395/94 |
| 5,983,251 A | * 11/1999 | Martens et al. ............. 708/203 |
| 6,157,747 A | * 12/2000 | Szeliski et al. ............. 382/284 |
| 6,320,173 B1 | * 11/2001 | Vock et al. .............. 250/206.1 |

FOREIGN PATENT DOCUMENTS

| EP | 465 375 A2 | 1/1992 | ............ H04N/5/14 |
| EP | 763 933 A2 | 3/1997 | ............ H04N/5/14 |
| JP | 62-114064 | 5/1987 | .................... 15/62 |
| JP | 8-162955 | 6/1996 | ...................... 1/14 |

OTHER PUBLICATIONS

Simoni, A. and G. Torelli, *A Single–Chip Optical Sensor with Analog Memory for Motion Detection*, Jul. 1995, IEEE Journal of Solid–State Circuits, vol. 30, No. 7.

* cited by examiner

Primary Examiner—Nhon Diep
(74) Attorney, Agent, or Firm—Glenn Patent Group; Michael A. Glenn (57) ABSTRACT

For detecting a change between pixel signals which chronologically follow one another, a current pixel value is first deteced and, subsequently, the difference between the detected pixel signal and a reference value is determined. Depending on the difference, it is determined whether there is a change of the detected pixel value in comparison with the preceding pixel values, the reference signal being produced from two or more pixel values preceding the detected pixel value.

10 Claims, 6 Drawing Sheets

METHOD AND DEVICE FOR DETECTING A CHANGE BETWEEN PIXEL SIGNALS WHICH CHRONOLOGICALLY FOLLOW ONE ANOTHER

DESCRIPTION

The present invention refers to a method and a device for detecting a change between pixel signals which chronologically follow one another, and in particular to a method and a device for detecting moving objects in picture sequences.

Picture sensor elements and the associated electronics represent in various arrangement, e.g. as a one-dimensional array (individual sensors, lines) or as a two-dimensional array, photosensitive integrated circuits (IC) and are implemented e.g. as integrated picture sensors in MOS technology. All photosensitive picture sensors can be used as picture sensor elements, the picture sensor elements implemented in CMOS technology offering a substantial advantage due to the integrability of photosensors and the associated electronics. In CMOS technology, the photodiode, the parasitic, bipolar phototransistor, the photogate and the photosensitive MOSFET (MOS field effect transistor) are known as photosensors. Reading out of the picture sensor elements known from CMOS technology can be carried out by integrated electronics.

The development of intelligent picture sensor elements has led to the result that picture processing algorithms are additionally integrated in the picture sensor elements. Due to the additionally integrated picture processing algorithms, a complex signal analysis of the read picture information with the associated arithmetic expenditure is carried out in the picture sensor element in advance, and a complicated classical picture processing is thus rendered superfluous. The bandwidth of the signal of the picture sensor elements is substantially reduced due to this integration, whereby the real-time ability of an integrated picture processing system is increased. The implemented picture processing algorithms determine the field of use of the integrated picture processing system. They are limited by the circuit techniques of the respective technology.

The use of various picture sensor elements in integrated MOS technology and the integrated electronics for reading the brightness values from the picture sensor elements is known from the prior art. Known picture sensor elements comprise either an individual pixel or a plurality of pixels which are arranged in arrays and which, in response to incident radiation, e.g. incident light, produce a pixel signal indicating e.g. the brightness value of a pixel or of a plurality of pixels. A multidimensional array of the individual pixels is normally referred to as a picture.

The combination of picture sensor elements to form so-called picture sensor networks, the integration of very simple algorithms, e.g. the formation of a difference between two successive pixel signals or pixel values, and the formation of a threshold value are also known from the prior art.

The methods and devices for detecting moving objects in successive pictures known from the prior art have, however, a plurality of disadvantages. The formation of a difference between two successive pixel signals or brightness values, which are pictures in the multidimensional sphere, is an algorithm, which, although it is, on the one hand, easy to integrate, has a high local resolution and entails little additional expenditure for the hardware to be integrated, represents, on the other hand, only the movement between two pixel signals or picture signals taken from pixel signals or pictures which chronologically follow one another, so that small movements cannot be detected. A further disadvantage in the case of difference formation are the so-called artifacts caused by different mechanisms. Such artifacts may be caused e.g. by illumination variations and noise when the picture is being taken, e.g. a temporal noise of the picture sensors, a noise of the A/D converter (analogue-to-digital converter) and of the other circuit elements forming locally restricted large difference values. These artifacts could then be detected as a movement by mistake.

Figure 6:
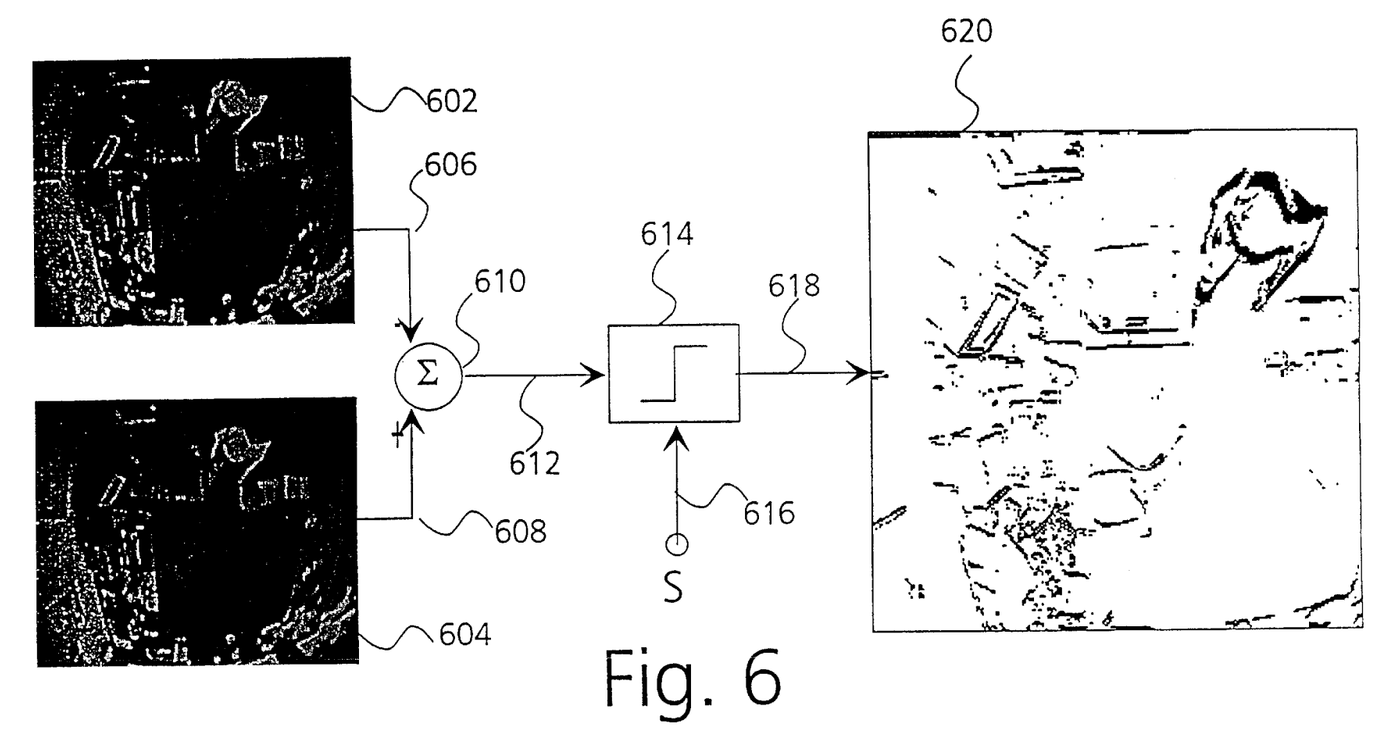
FIG. 6 shows a schematic representation of a differential picture algorithm known from the prior art and of the resultant differential picture.

An example of such incorrect detection is shown on the basis of FIG. 6. FIG. 6 schematically shows an algorithm according to the prior art in the case of which a first picture 602 and a second picture 604, or, to be exact, signals representing these pictures, are supplied to a difference former 610 via respective lines 606 and 608. The first picture 602 is the instantaneously detected picture and the picture 604 is the picture detected in the preceding sampling process. The pictures 602 and 610 show, by way of example, a perspective view of a work-room in which a person (at the upper right of the pictures) is present whose movements are to be detected. As indicated by the plus sign and the minus sign at the difference former 610, a difference is formed between the first picture 602 and the second picture 604 so that a signal, which is representative of the difference between the first picture 602 and the second picture 604, will be obtained on the output line 612 of the difference former 610. The signal 612 is inputted in a threshold former 614 having a threshold value S supplied thereto via a line 616. The output line 618 of the threshold former 614 has then applied thereto a binary output signal which is obtained on the basis of the difference-forming algorithm known from the prior art. The binary differential picture is generally designated by reference numeral 620. A movement of the person can be seen in the binary picture 620 at the upper right, the contours of the person are emphasized in comparison with those of the other objects in the room.

Starting from this prior art, it is the object of the present invention to provide a method and a device for detecting a change between pixel signals which chronologically follow one another by means of which movements can be detected more definitely and also small movements can be detected and in the case of which artifacts are prevented from occurring.

This object is achieved by a method according to claim 1 as well as by a device according to claim 9.

The present invention provides a method of detecting a change between pixel signals which chronologically follow one another, the method comprising the steps of:
  detecting a pixel signal;
  forming a difference between the detected pixel signal and a reference signal; and
  determining, in dependence upon this difference, whether there is a change of the detected pixel in comparison with a preceding pixel signal;
  wherein the reference signal is produced from at least two pixel signals preceding the detected pixel signal.

The present invention provides a device for detecting a change between pixel signals which chronologically follow one another, the device comprising:
  a sensor element producing a pixel signal in dependence upon a radiation power incident thereon;
  a subtracter forming a difference between the pixel signal produced by the sensor element and a stored reference signal; and a judging means judging in dependence upon the difference formed whether there is a change of the detected pixel signal in comparison with preceding pixel signals;

wherein the reference signal is produced from at least two pixel signals preceding the pixel signal produced.

According to a preferred embodiment of the present invention, the reference signal is produced by means of time-recursive calculation.

Preferred embodiments of the present invention are defined in the subclaims.

In the following, preferred embodiments of the present invention are described in detail on the basis of the drawing enclosed, in which.

In the description of the preferred embodiments following hereinbelow so-called picture signals are referred to with regard to the signals to be processed. Reference is made to the fact that the present invention is not limited to such picture signals, but that the present invention also permits a detection of the signals of individual pixels (referred to as pixel signals in the following).

Figure 1:
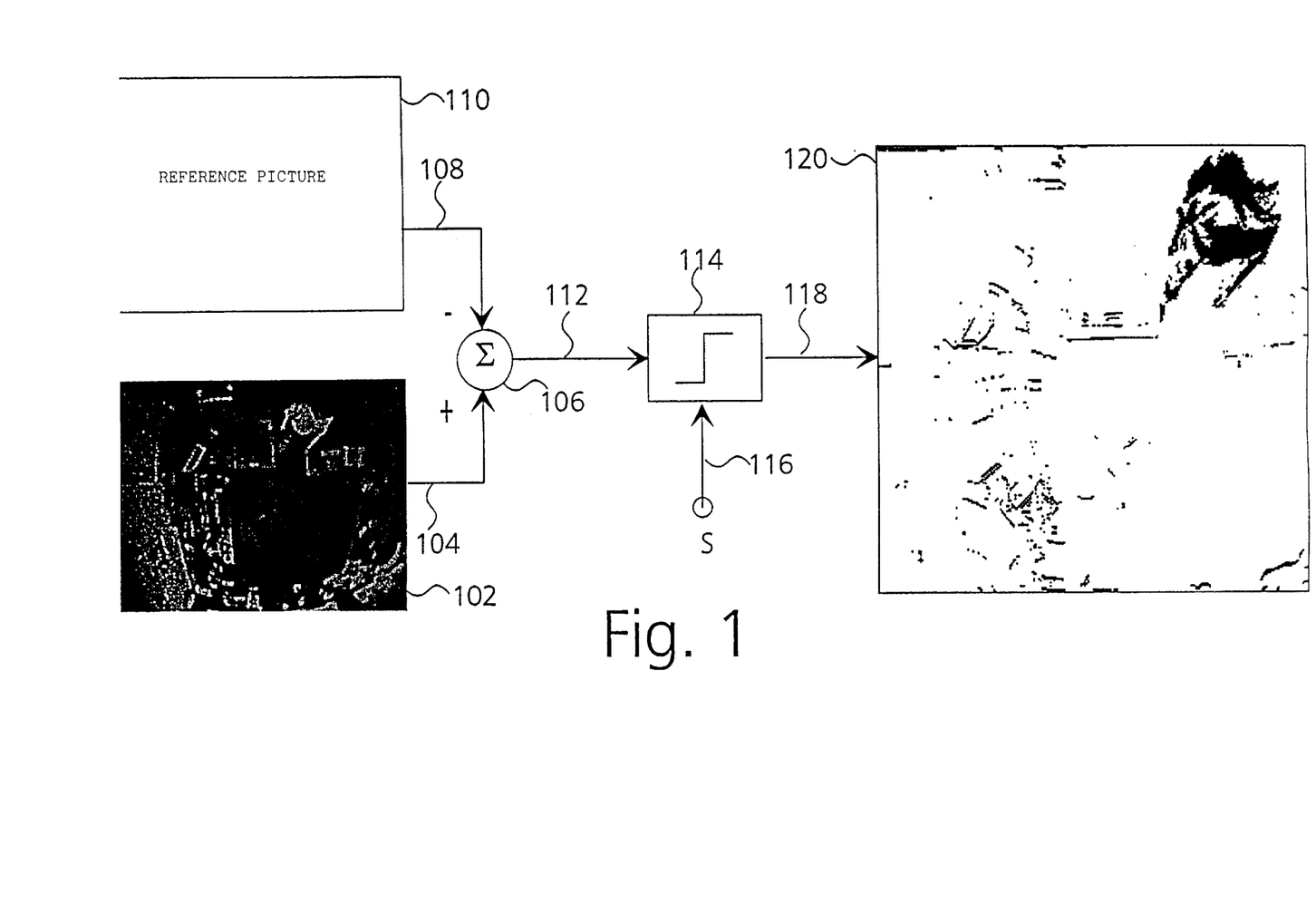
FIG. 1 shows a schematic representation of the result of the use of the method according to the present invention in accordance with a first embodiment.

On the basis of FIG. 1, the method according to the present invention will be described in detail in the following. A current picture 102, which, as can be seen in FIG. 6, shows a perspective view of a work-room in which a person (at the upper right of the picture) is present whose movements are to be detected, is detected by conventional means, e.g. by a photodetector or by some other radiation-sensitive sensor element, and a signal representative of the current picture 102 is applied to line 104. Instead of representing the current picture 102 shown, the signal applied to line 104 can also be a signal representing a current pixel so that the signal will be called pixel signal in this case. Depending on the kind of sensor elements used, the signal applied to line 104 is a picture signal or a pixel signal. When a sensor element is used which permits reading of individual pixels or which represents only one pixel, a pixel signal is applied to line 104, whereas in the case of a sensor element permitting a multidimensional representation a picture signal is applied to line 104. The line 104 is connected to a positive input of a difference former 106. A negative input of the difference former 106 is connected to a line 108 having signals applied thereto which represent a reference picture 110 and a reference pixel signal, respectively. Hence, line 108 has a reference signal applied thereto, which is supplied to the difference former. The difference former 106 forms a differential signal between the picture signal applied to line 104 and the reference signal applied to line 108; this differential signal is applied to line 112 and represents a differential picture. The line 112 is connected to an input of a threshold former 114 which receives a threshold value S via a further input and a line 116. The output of the threshold former 114 has a signal representing a binary differential picture 120 applied thereto via line 118; from this signal a movement between the two picture signals can be discerned without the influence of artifacts and with the possibility of detecting small movements. According to the present invention, the reference signal is generated from at least two picture signals or pixel signals preceding the detected picture signal or pixel signal. As can be seen from a comparison between the binary differential pictures 620 and 120 in FIGS. 6 and 1, a movement of the person (at the upper right of the binary picture) is detected more definitely according to the present invention, as can be seen in the binary picture 120 from the clearer contours of the moving person and the vaguer contours of the other objects in the room.

According to a preferred embodiment of the present invention, an algorithm is used, which calculates the reference signal or the reference value time-recursively for each pixel sensor element or picture sensor element so as to improve the conventional difference-forming algorithm known from the prior art. This means that the reference signal or the reference value has stored therein with a weighting all temporally preceding brightness values of the picture sensor element, which will also be referred to as picture sensor values in the following. By means of this temporal recursion, the above-described artifacts can be suppressed and movements can be emphasized, as can be seen from a comparison between FIGS. 1 and 6.

One advantage of the present invention is to be seen in the fact that the method according to the present invention can be integrated in the picture sensor element as an algorithm so that the temporal noise with regard to picture taking will additionally be reduced, since picture processing and digitizing take place already prior to the reading of the sensor element. Furthermore, in comparison with the analog picture sensor signal, the binary picture sensor signal is much less sensitive to interfering influences.

The conversion of the analog picture sensor signal into a binary signal reduces the bandwidth required for transmission so that the possibility of reading the binary picture sensor values in real time suggests itself. A subsequent analysis of the binary pictures (motion pictures) can be carried out with the aid of simple hardware and algorithms depending on the respective demands so that the movement of individual objects can be followed and stored in real time.

Making reference to FIG. 2, a block diagram will be described in the following, in which an embodiment of the method according to the present invention is shown in detail.

A picture sensor element 200 detects a pixel or a picture and produces a signal which corresponds to the detected picture or pixel and which is referred to as current picture sensor value x(t), as shown by block 202. The block 202 is connected to block 204 which contains the current picture sensor value for a read-out period T representing the reciprocal of the read-out rate. The result from block 204 is weighted by means of a first weighting coefficient $a_1$ and supplied to a summing node 206. In block 208 the reference value is shown, which is a so-called time-recursive reference value r(t) according to the present embodiment. The block 208 is connected to block 210 which produces the reference value for the sampling period T. The reference value produced in this way is weighted by means of a second weighting coefficient $a_2$ and is also supplied to the summing node 206, which makes the resulting sum available to block 208. The block 202 and the block 208 are connected to a node 212 which forms the difference between the values outputted from the blocks 202 and 208, viz. x(t) and r(t), so as to produce the differential value d(t). The differential value d(t) is inputted in a threshold former 214 and the output of the threshold former 214 has the binary signal b(t) applied thereto.

The method as described according to the block diagram in FIG. 2 produces for specific sampling time values the signals shown on the basis of the equations following hereinbelow. The values for n are explained in detail on the basis of the time arrow in which $M_u$ is designated as the sampling time of a picture at a lower limit of the detection process, i.e. a time at which a first picture was produced, and in which $M_O$ is designated as the sampling time of a picture at an upper limit of the detection process, i.e. a time at which a last picture is to be produced.

$$b(n \cdot T) = \begin{cases} 1 \text{ für } d(n \cdot T) \geq S \\ 0 \text{ sonst} \end{cases} \quad (1)$$

mit $n \in \{M_u + 1, \ldots, 1, \ldots, M_o\}$ $$d(n \cdot T) = x(n \cdot T) - a_1 \cdot \sum_{i=1}^{M_u} a_2^{i-1} \cdot x((n-i) \cdot T) \quad (2)$$

$$a_1 + a_2 = 1 \quad (3)$$

wherein:

$x(t)$ current picture sensor value $r(t)$ time-recursive reference value, $d(t)$ differential value $b(t)$ binary signal $S$ threshold value $T$ 1/read-out rate $t$ time.

Reference is made to the fact that condition 3 must be fulfilled in any case.

Figure 2:
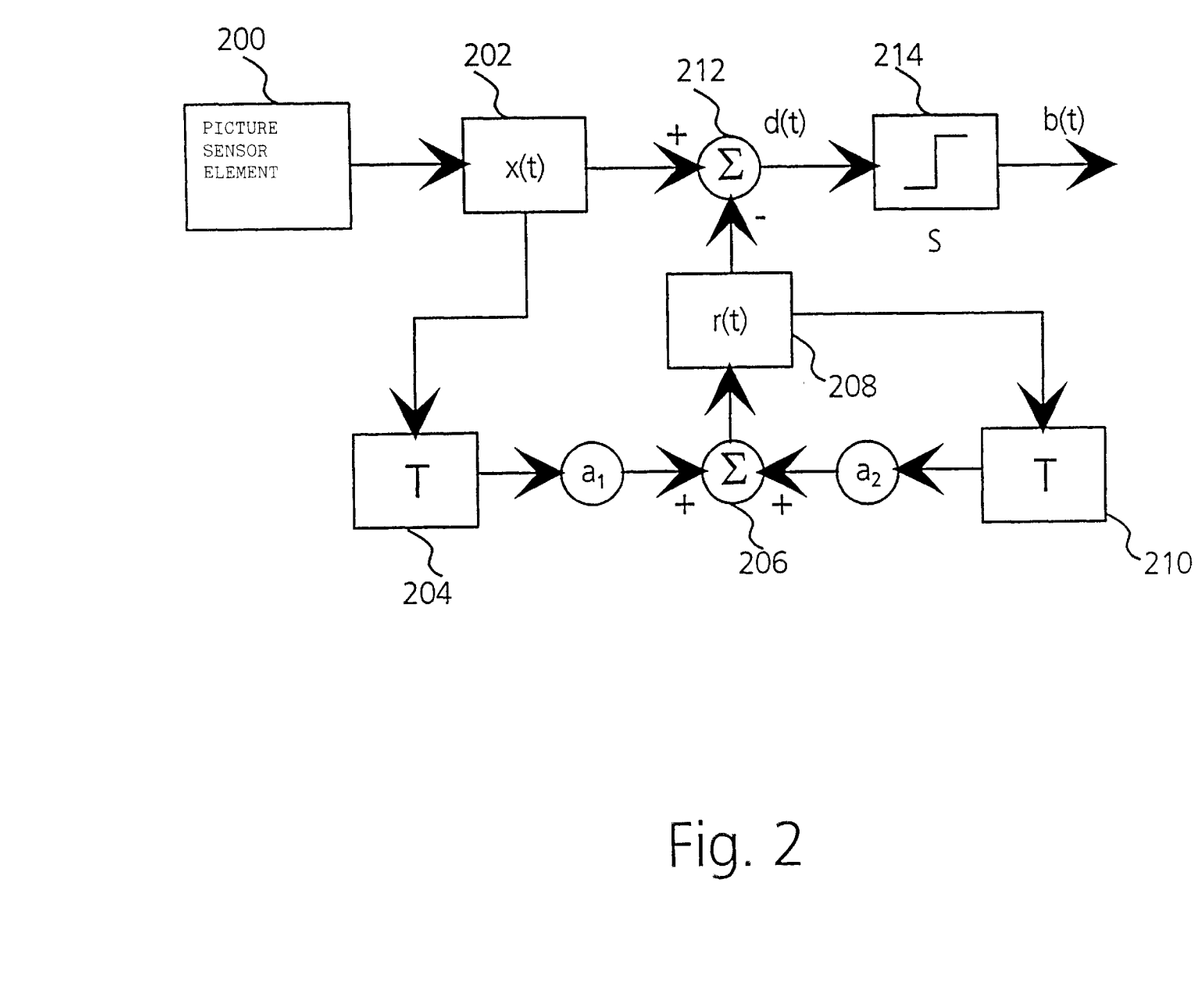
FIG. 2 shows a block diagram in which the method according to the present invention is shown in detail.

The recursive calculation of the reference value shown on the basis of FIG. 2 represents a first-order low-pass filtering and the difference formation between the current picture sensor value and the time-recursive reference value represents a high-pass filtering. The combination can therefore be referred to as bandpass filter whose corner frequencies can be adjusted via the weighting coefficients $a_1$, $a_2$ and the read-out rate T of the pixels and pictures, respectively. An adaptation of the reference value to the current picture sensor values can be adjusted via the read-out rate. The higher the read-out rate is, the faster the reference value will be adapted. The coefficients $a_1$, $a_2$ determine the weighting of the reference value and of the current picture sensor value. The adaptation rate of the reference value during a recursion can be determined via these coefficients.

In the following, a first embodiment of the device according to the present invention will be explained in detail on the basis of FIG. 3 which shows a schematic representation of the device according to the present invention.

Figure 3:
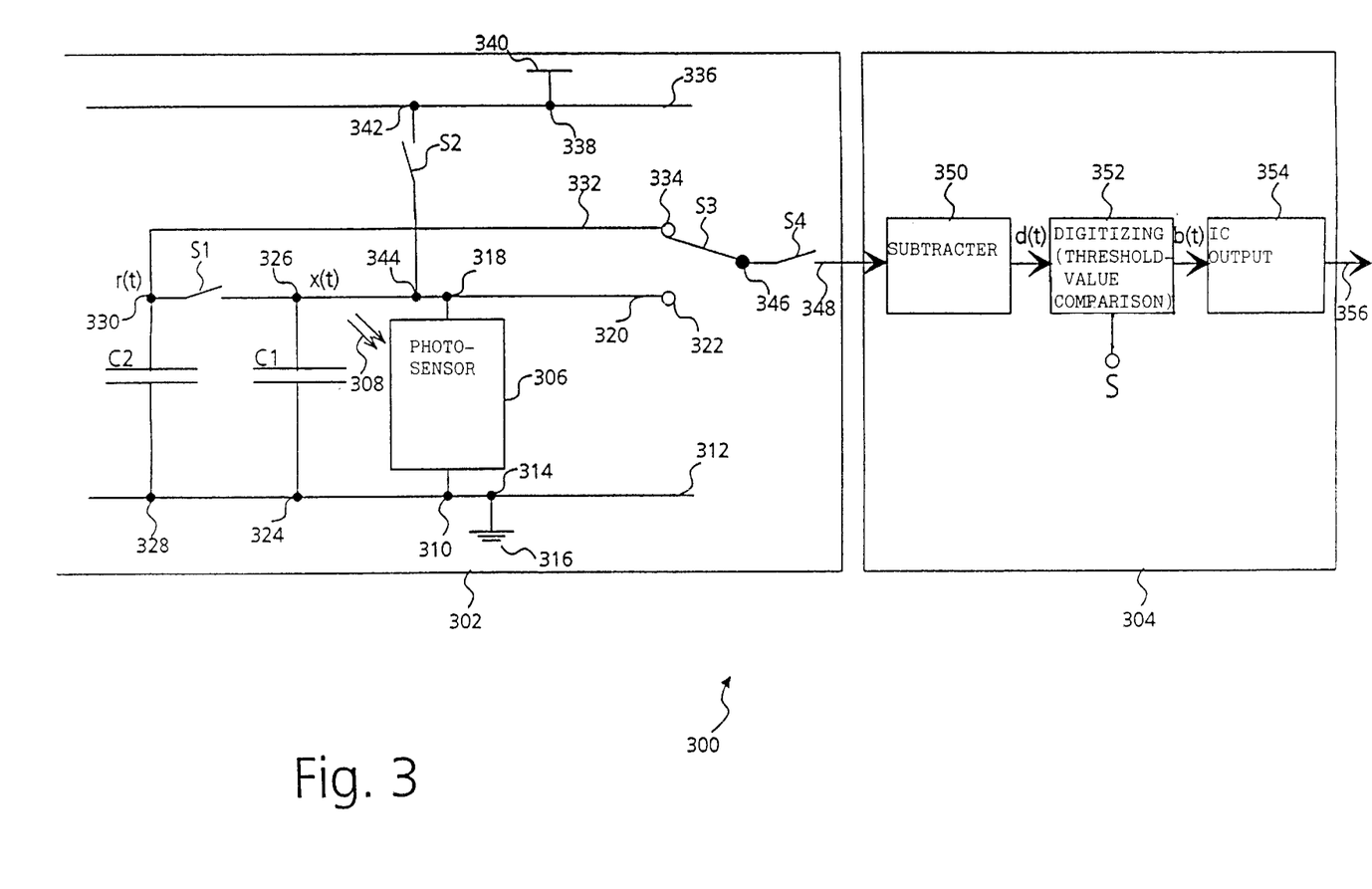
FIG. 3 shows a schematic representation of the device according to the present invention in accordance with one embodiment.

In FIG. 3, the device is designated generally by reference numeral 300 and comprises a picture sensor element 302 as well as a read-out circuit 304. Part of the method according to the present invention takes place in the integrated picture sensor element 302 of an array, whereas the other part takes place during the read-out operation, i.e. when the picture sensor element 302 is accessed by a peripheral circuit which may, for example, be incorporated.

The picture sensor element 302 comprises a photosensor 306 which responds to an incident radiation, as shown schematically by the arrows 308. The photosensor is connected via a first node 310 to a first line 312 which is connected to ground 316 via a second node 314. The photosensor 306 is connected via a third node 318 to a second line 320 provided with a terminal 322. A first capacitor C1 is connected in parallel with the photosensor 306 and connected to line 312 via a fourth node 324 and to line 320 via a fifth node 326. A second capacitor C2 is connected to line 312 via a sixth node 328 and has the other end thereof connected to a seventh node 330. A switch S1 is arranged in line 320 between the fifth node 326 and the sixth node 330, the fifth node 326 and the seventh node 330 being adapted to be connected via this switch S1. The seventh node 330 is connected to a third line 332 provided with a terminal 334. The picture sensor element 302 further comprises a fourth line 336 connected to a supply terminal 340 via an eighth node 338. Between a ninth node 342 on line 336 and a tenth node on line 320, a second switch S2 is provided through which line 320 is adapted to be connected to the supply terminal 340. A third switch S3 is provided for connecting an eleventh node 346 to the terminal 334 of line 332 or to the terminal 322 of line 320. A terminal 348 of the picture sensor element is adapted to be connected to the eleventh node 346 via a fourth switch S4.

The read-out circuit 304 is provided with a subtracter 350 whose input is connected to the output 348 of the picture sensor element 302. The differential signal d(t) is applied to the output of the subtracter; this differential signal d(t) is inputted in a threshold former 352 which receives a predetermined threshold value S at a further terminal. The binary signal b(t) is applied to the output of the threshold former; this binary signal b(t) is applied to an IC output 354, e.g. an output driver, whose output is connected to the output 356 of the read-out circuit.

The acquisition of the picture sensor value x(t) (cf. FIG. 3) as well as the generation and the storage of the reference value r(t) take place in the picture sensor element 302. The switch S4 represents a selector switch for the picture sensor element 302 and is constantly closed, i.e. switched through, when the picture sensor element 302 is being accessed. At the beginning of a picture acquisition, the switch S2 is closed for a short period of time. This has the effect that the potential of the tenth node 344 for x(t) is raised e.g. to a positive supply voltage $U_{DD}$ and consequently reset. The resetting potential 340 need not necessarily be chosen to be $U_{DD}$, but it can also be applied from outside in a freely selectable manner. Following this, the switch S2 is opened and the potential of the tenth node 344 for x(t) on the capacitor C1 is reduced in proportion to the incident light power via the photocurrent produced by the photosensor 306. This process lasts for a predetermined time, which will be referred to as integration time in the following. The photosensor 306 can e.g. be a photodiode, a bipolar phototransistor or a photosensitive MOSFET. The capacitor C1 can be formed e.g. by a capacitance of the sequence conductor-insulator-semiconductor, e.g. polysilicon-$SiO_2$—Si, or by the capacitance of the space-charge region of a diode. The potential on the capacitor C2, which represents the preceding reference value r(t-T), is read via the switch S3 at the position shown in FIG. 3 and stored, whereupon it is combined with the signal x(t) by the subtracter 350. Following this, the switch S3 is changed over so as to connect the terminal 322 of line 320 to the eleventh node 346. This has the effect that the potential corresponding to the current picture sensor value x(t) is read from the picture sensor element 302. Subsequently, the switch S1 is closed, i.e. the fifth node 326 and the seventh node 330 are connected, so as to form the current reference value r(t) by distributing the stored charge via the closed switch S1 over both capacitors C1 and C2. The potential which then occurs on the capacitor C2 and which represents the current reference value r(t) corresponds to:

$$r(t)=a_1 x(t)+a_2 r(t-T)$$

wherein:

r(t) . . . current reference value x(t) . . . current picture sensor value r(t-T) . . . old reference value $a_1$ . . . first weighting coefficient $a_2$ . . . second weighting coefficient t . . . time.

For the weighting coefficients $a_1$ and $a_2$, the following holds true:

$$a_1 = \frac{C_1}{(C_1 + C_2)}; \quad a_2 = \frac{C_2}{(C_1 + C_2)}$$

so that $a_1+a_2=1$.

The weighting coefficients $a_1$ and $a_2$ can be changed by programming the capacitance values of the capacitors C1 and C2 by composing the capacitances C1 and C2 of a plurality of partial capacitances which can be connected together.

The peripheral selection circuit 304 then carries out the subtraction x(t)−r(t-T), whereupon it forms the binary value (threshold value comparison of x(t)−r(t-T)) with an externally adjustable threshold value S.

On the basis of FIG. 4, a further embodiment for developing the device according to the present invention will be described in detail in the following.

The device is designated generally by reference numeral 400 and comprises a picture sensor element 402 as well as a read-out circuit 404. The components of the picture sensor element which have already been described making reference to FIG. 3 are provided with the same reference numerals in FIG. 4 and a renewed description is dispensed with.

Figure 4:
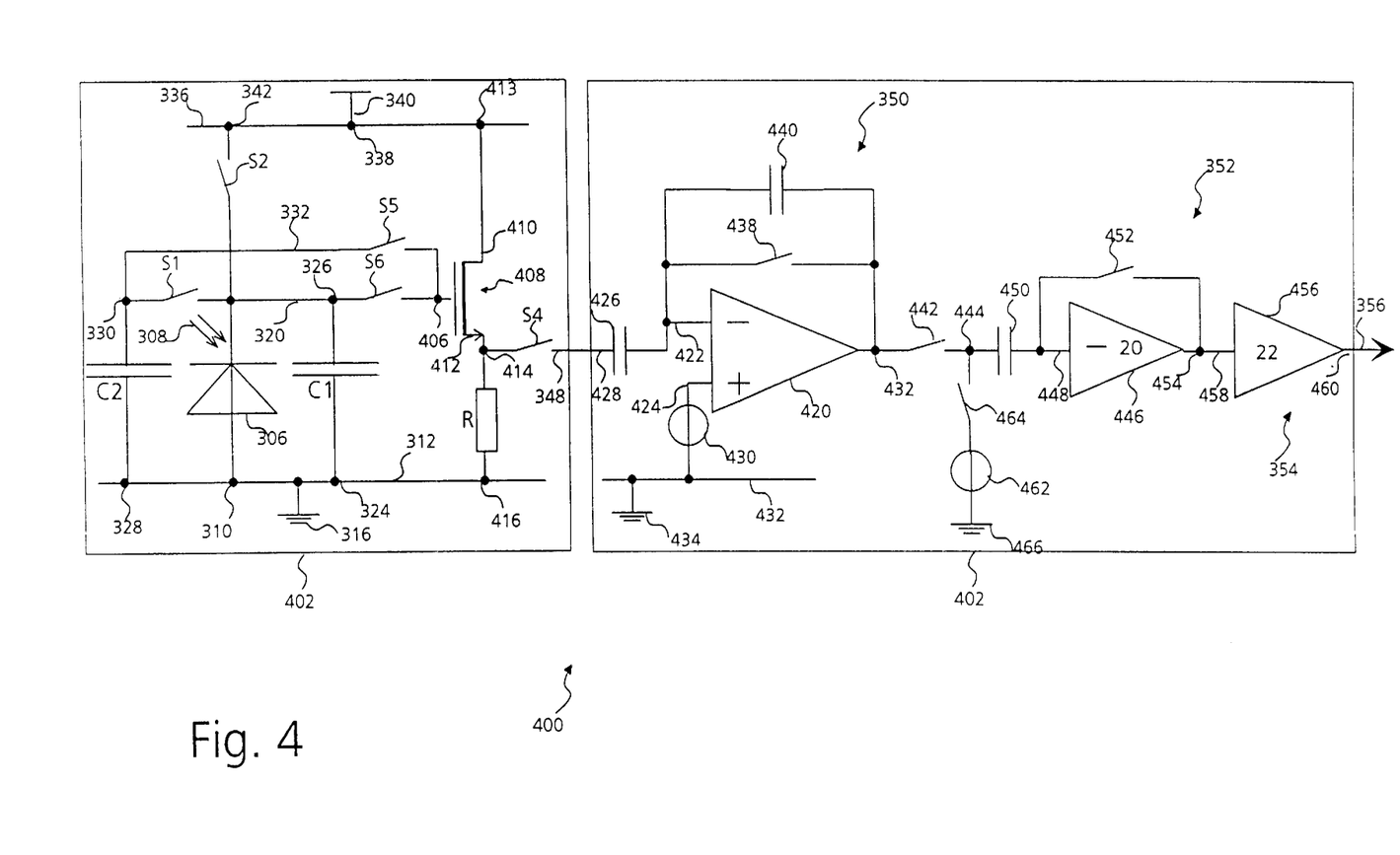
FIG. 4 shows a detailed representation of a further embodiment of the device according to the present invention.

Other than in the case of the example shown in FIG. 3, the switch S3, which carries out a change-over, consists of two individual switches in the embodiment shown in FIG. 4, viz. a fifth switch S5 connecting the line 332 to a twelfth node 406 and a sixth switch S6 connecting the line 320 to the twelfth node 406. In addition, a source follower 408 is provided whose gate terminal is connected to the twelfth node 406. The drain terminal 410 of the source follower 408 is connected to line 336 via a thirteenth node 412. The source terminal 412 of the transistor 408 is connected to a fourteenth node 414 which is connected to line 312 via a resistor R and a fifteenth node 416. The switch S4 serves to connect the output 348 of the picture sensor element 402 to the fourteenth node 414.

In the embodiment shown in FIG. 4, the photosensor element 306 is defined by a photodiode. The first, second and third switches are defined by MOS switches and the fifth and the six switch, which form together a change-over switch, are also MOS switches. The capacitance of the capacitor C1 is formed by the barrier-layer capacitance of the space-charge region of the photodiode 306, and the capacitance of the capacitor C2 is formed by the layer sequence polysilicon-$SiO_2$—Si.

The read-out circuit 404 comprises the subtracter 350, which has already been shown in FIG. 3 and which comprises an operational amplifier 420 with an inverting input 422 and a non-inverting input 424. The inverting input 422 of the operational amplifier 420 is connected via an input capacitance 426 to an input 428 of the read-out circuit which is, in turn, connected to the output 348 of the picture sensor element 402. The non-inverting input 424 of the operational amplifier 420 is connected to a terminal of a reference voltage source 430 whose other terminal is connected to ground 434 via a line 432. A feedback switch 438 is connected between the inverting input 422 of the operational amplifier and an output 436 of the operational amplifier, a feedback capacitance 440 being connected in parallel to this feedback switch 438.

The output 432 of the operational amplifier is connected to a node 444 via a switch 442. The threshold former 352 comprises an inverter 446 whose input 448 is connected to a terminal of an input capacitance 450. The other terminal of the input capacitance 450 is connected to the node 444. The input 448 of the inverter 446 is connected to an output 454 of the inverter via a switch 452.

The IC output 354 comprises a digital buffer 456 whose input 458 is connected to the output 454 of the inverter 446. The output 460 of the buffer 456 is connected to the output 356 of the read-out circuit 404.

A voltage source 462 is connected to the node 444 via a switch 464. The other terminal of the voltage source 462 is connected to an earth terminal 466.

The subtracter 350 is an SC subtracter and consists of an operational amplifier 420, the reference voltage source 430 for adjusting the operating point of the operational amplifier 420, the input capacitance 426, the feedback switch 438 as well as the feedback capacitance 440.

The threshold former 352 comprises an SC comparator consisting of the input capacitance 450, the MOS switches 442 and 464, the inverter 446 and the feedback switch 452. The threshold value S is adjusted via the voltage source 462.

The IC output 354 comprises a driver which comprises the digital buffer 456, the output 356 of the read-out circuit representing the chip output.

Figure 5:
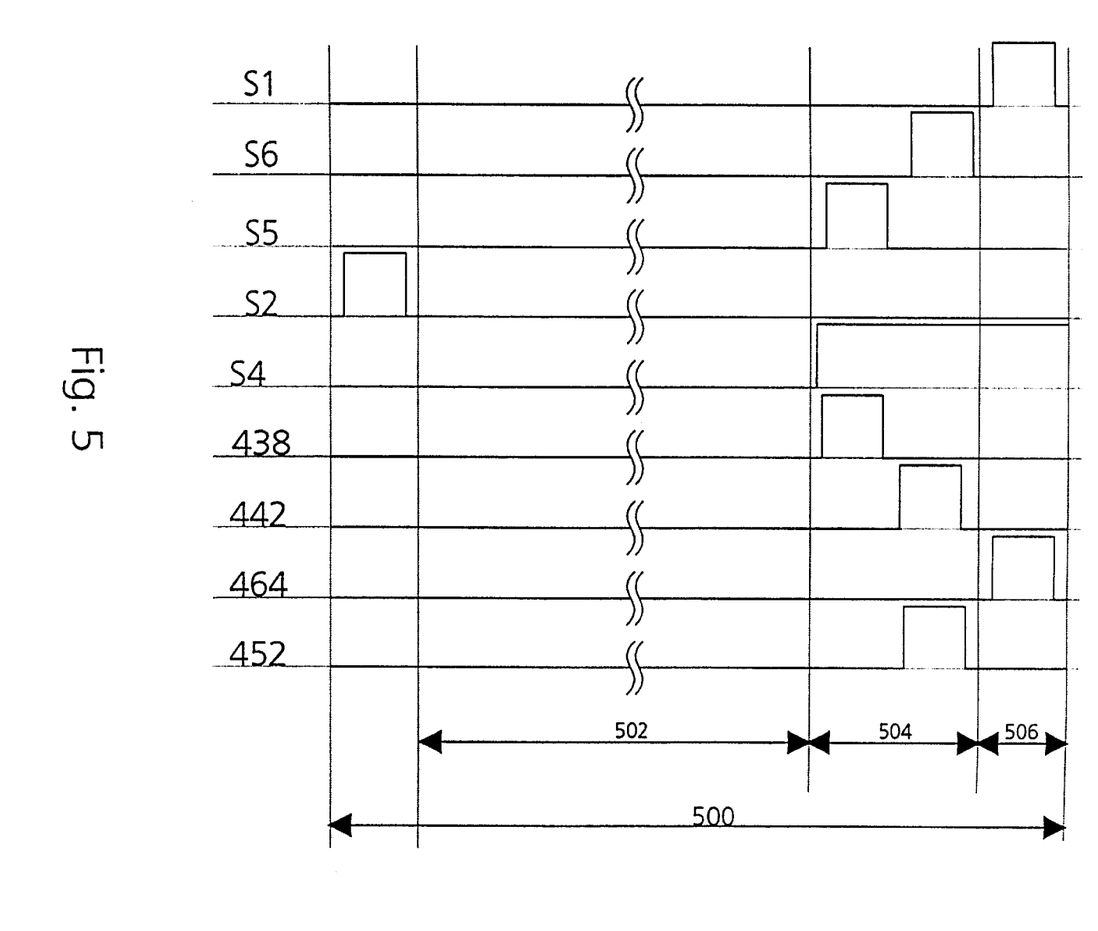
FIG. 5 shows a clock diagram of the switches shown in FIG. 4.

The clock pulse diagram of the switches shown in FIG. 4, which is shown in FIG. 5, shows the chronological sequence in the case of a concrete embodiment in detail.

At the beginning of a period 500, the potential on the capacitor C1 is set to the resetting potential 340 via the switch S2. The period 502 is the integration time, i.e. the time within which the potential on the capacitor C1 can decrease proportionally to the light power incident on the photosensor 306. When e.g. a two-dimensional array is employed, this period can be utilized by accessing other picture sensor elements of the array, since the switch S4 is not switched through. Within the period 504, difference formation between r(t-T) and x(t) takes place. At the beginning of period 504, the previously generated reference value r(t-T) is read via the switches S5 and S4 and stored on the capacitance 426. The switch 438 is also closed so as to bring the operational amplifier 420 to its operating point. In the second half of period 504, x(t) is read via the switches S6 and S4 and the differential value is stored on the capacitance 440 by opening the switch 438. The differential value is applied to the output 432 of the operational amplifier 420. The differential value is stored via the switch 442 on the capacitance 450 by fully coupling back the inverter 446 via the switch 452. In the period 506, the actual threshold comparison, i.e. the digitizing, takes place. Switch 442 is opened, and the voltage from the voltage source 462 is now applied via the switch 464 for threshold comparison. The switch 452 is opened and the inverter 446 operates as a comparator. The binary result of the threshold comparison can now arrive at the output 356 of the IC via the digital buffer 456. For reading out and for digitizing the whole array, i.e. a complete picture, the period 500 is required. Normally, T also corresponds to the period 500.

In addition, the switch S1 is closed in the period 506 in which the switches S2, S5 and S6 are opened, so as to cause the above-described formation of the new reference value by equalizing the potentials on the capacitors C1 and C2.

What is claimed is:

1. A method of detecting a change between pixel signals which chronologically follow one another, said method comprising the steps of:

detecting a pixel signal (x(t));

forming a difference between the detected pixel signal (x(t)) and a reference signal (r(t)), said reference signal (r(t)) being a time-recursive signal determined on the basis of at least two pixel signals preceding the detected pixel signal (x(t)); and determining, in dependence upon said difference, whether there is a change of the detected pixel signal (x(t)) in comparison with a preceding pixel signal;

wherein the at least two pixel signals preceding the detected pixel signal are each weighted with a predetermined weighting ($a_1$, $a_2$) in such a way that the pixel signals which are temporally closer to the detected pixel signal are weighted more strongly than the pixel signals which are temporally more remote from the detected pixel signal.

2. The method according to claim 1, wherein the determination step further comprises the step of:

forming a threshold value.

3. The method according to claim 1, wherein the time-recursive determination of the reference signal (r(t)) is carried out in accordance with the equation of:

$$r(t) = a_1 \cdot \sum_{i=1}^{M_u} a_2^{i-1} \cdot x((n-1) \cdot T)$$

wherein r(t) refers to time-recursive reference signal;

x(t) refers to current pixel signal;

$a_1$ refers to first weighting coefficient;

$a_2$ refers to second weighting coefficient;

n refers to 0, 1, 2, . . . ∞;

T refers to 1/detection rate of the pixel signal;

t refers to time;

$M_u$ refers to sampling time at a lower limit of the detection process;

$M_o$ refers to sampling time at an upper limit of the detection process, and wherein the difference is formed according to the equations of:

$$d(n \cdot T) = x(n \cdot T) - a_1 \cdot \sum_{i=1}^{M_u} a_2^{i-1} \cdot x((n-i) \cdot T); \text{ and}$$

$$a_1 + a_2 = 1$$

wherein d(t) refers to differential signal.

4. The method according to claim 3, wherein the threshold value is formed according to the equation of:

$$b(n \cdot T) = \begin{cases} 1 \text{ for } d(n \cdot T) \geq S \\ 0 \text{ otherwise} \end{cases}$$

with $n \in \{M_u + 1, \ldots, 1, \ldots, M_o\}$ wherein b(t) refers to binary signal, and S refers to threshold value.

5. The method according to claim 1, wherein the pixel signals are produced on the basis of a radiation power incident on a sensor element (306) and they represent a brightness value.

6. The method according to claim 5, wherein the sensor element (306) comprises a plurality of pixels so as to detect a plurality of pixel signals representing a picture.

7. A device for detecting a change between pixel signals which chronologically follow one another, said device comprising:

a sensor element (306) producing a pixel signal (x(t)) in dependence upon a radiation power (308) incident thereon;

a subtractor (350) forming a difference between the pixel signal (x(t)) produced by the sensor element (306) and a stored reference signal (r(t)), said reference signal (r(t)) being a time-recursive signal determined on the basis of at least two pixel signals preceding the detected pixel signal (x(t)); and a judging means (352) judging in dependence upon the difference formed whether there is a change of the pixel signal produced (x(t)) in comparison with preceding pixel signals;

wherein the at least two pixel signals preceding the detected pixel signal are each weighted with a predetermined weighting ($a_1$, $a_2$) in such a way that the pixel signals which are temporally closer to the detected pixel signal are weighted more strongly than the pixel signals which are temporally more remote from the detected pixel signal.

8. The device according to claim 7, wherein the sensor element (306) is a photosensitive element.

9. The device according to claim 7, further comprising:

a first capacitor ($C_2$) which stores the reference signal (r(t)); and a second capacitor ($C_1$) which stores the pixel signal (x(t));

wherein after the reading of the reference signal and of the pixel signal the charges stored in both capacitors ($C_2$, $C_1$) are distributed over both capacitors so as to produce a new reference signal according to the equation of:

$$r(t) = a_1 x(t) + a_2 r(t-T)$$

wherein r(t) refers to current reference value;

x(t) refers to current picture sensor value;

r(t-T) refers to old reference value;

$a_1$ refers to first weighting coefficient;

$a_2$ refers to second weighting coefficient; and

T refers to 1/detection time.

10. The device according to claim 9, wherein the capacitors ($C_2$, $C_1$) are connected in parallel and that the following equation holds true for the weighting coefficients:

$$a_1 = \frac{C_1}{(C_1 + C_2)}; \quad a_2 = \frac{C_2}{(C_1 + C_2)}.$$

* * * * *